United States Patent
Flotte et al.

(10) Patent No.: US 8,145,365 B2
(45) Date of Patent: Mar. 27, 2012

(54) AIR NAVIGATION AID METHOD AND SYSTEM MAKING IT POSSIBLE TO MAINTAIN VERTICAL MARGINS

(75) Inventors: Laurent Flotte, Aurade (FR); Nicolas Marty, Saint Sauveur (FR); Aurélie Sallier, Toulouse (FR)

(73) Assignee: Thales, Neuilly sur Seine (FR)

( * ) Notice: Subject to any disclaimer, the term of this patent is extended or adjusted under 35 U.S.C. 154(b) by 459 days.

(21) Appl. No.: 12/487,919

(22) Filed: Jun. 19, 2009

(65) Prior Publication Data

US 2010/0004801 A1    Jan. 7, 2010

(30) Foreign Application Priority Data

Jun. 20, 2008  (FR) ...................... 08 03462

(51) Int. Cl.
G05D 1/00    (2006.01)
(52) U.S. Cl. ................. 701/8; 701/14; 701/16; 701/301
(58) Field of Classification Search ............... 701/3–16, 701/300, 301
See application file for complete search history.

(56) References Cited

U.S. PATENT DOCUMENTS

| 2008/0198041 A1 | 8/2008 | Sallier et al. |
| 2008/0306691 A1 * | 12/2008 | Louis et al. ................. 701/301 |
| 2009/0132103 A1 | 5/2009 | Marty et al. |
| 2009/0138145 A1 | 5/2009 | Meunier et al. |
| 2009/0157241 A1 | 6/2009 | Meunier et al. |

FOREIGN PATENT DOCUMENTS

| EP | 0565399 A | 10/1993 |
| EP | 1598718 A | 11/2005 |
| FR | 2864269 A | 6/2005 |
| FR | 2881533 A | 8/2006 |

OTHER PUBLICATIONS

U.S. Appl. No. 12/118,129, filed May 9, 2008.
U.S. Appl. No. 12/479,957, filed Jun. 8, 2009.
U.S. Appl. No. 12/478,367, filed Jun. 4, 2009.

* cited by examiner

Primary Examiner — Richard M. Camby
(74) Attorney, Agent, or Firm — LeRiviere, Grubman & Payne, LLP (57) ABSTRACT

The invention relates to a calculation method for an aircraft navigation aid system making it possible to maintain a vertical safety margin with an obstruction profile, the aircraft comprising a navigation system, an automatic piloting system, a database system and a display device, characterized in that the method comprises the following steps: calculation of an obstruction altitude profile, calculation of a vertical safety margin with respect to the obstruction profile, of a plurality of vertical safety trajectories and of the respective flight setpoints for the aircraft to execute the trajectories, selection of the flight setpoints making it possible to maintain the aircraft as close as possible to the obstruction profile while maintaining between the aircraft and the obstruction profile at least the vertical safety margin, filtering of the flight set point values so that the variation of the values of the setpoints does not exceed a variation difference in a duration predefined in the system.

17 Claims, 6 Drawing Sheets

AIR NAVIGATION AID METHOD AND SYSTEM MAKING IT POSSIBLE TO MAINTAIN VERTICAL MARGINS

PRIORITY CLAIM

This application claims priority to French Patent Application Number 08 03462, entitled Air Navigation Aid Method and System Making it Possible to Maintain Vertical Margins, filed on Jun. 20, 2008.

FIELD OF THE INVENTION

The invention relates to the field of air navigation aids for the prevention of accidents in which the aircraft, still maneuverable, comes into collision with an obstacle. The term "obstacle" hereinafter designates any non-natural obstruction present in the environment of the aircraft, notably human constructions such as buildings or bridges. Moreover, the term "relief" or "terrain" designates the obstructions relating to the natural environment such as mountainous areas and, more generally, the ground.

Because of the type of missions carried out, landing and taking off in areas that are difficult to access, sometimes unprepared, or flying at low altitude, the helicopter, for example, is a craft that is very greatly exposed to the risk of collision with obstacles situated in its nearby environment. Over and above the geographic aspect, in health evacuation operations, the use of the helicopter is very often reserved for emergency survival cases for which the speed of action and continuation of the mission are vital for the victim to be rescued. The urgent nature of the mission and the attendant risk-taking further increase the risks of being in proximity to obstacles.

BACKGROUND OF THE INVENTION

Those skilled in the art are familiar with terrain awareness and warning systems (TAWS). The purpose of these systems is to generate an alert when the aircraft is in a hazardous situation where the operational margins are no longer observed. The TAWSs, in the form of a stand-alone computer or incorporated with the TCAS (traffic collision avoidance system) and WXR (weather band X radar) functions in an ISS (integrated surveillance system), fulfil a primary anti-collision surveillance function ("safety net") with the terrain and are designed to transmit sound alerts upon an exceptional approach of the relief enabling the crew to react by engaging a vertical resource before it is too late. To do this, the TAWS systems, decoupled from navigation systems, proceed in two ways. They periodically compare the theoretical trajectory that the aircraft would describe in a resource and compare it to a cross section of the terrain and to the obstacles being flown over obtained from a digital world or local terrain model installed on the computer. Or there are some TAWSs that also incorporate "reactive modes" which, by periodically comparing certain of the current parameters of the craft, for example the radio-altitude and the vertical speed, determine through different charts whether the current situation of the aircraft is a normal situation or whether it is potentially dangerous. In the latter case, an alert, limited to an oral message, is generated to inform the crew. The availability of a model of the terrain allows functions that make it possible to improve the perception of the situation on the part of the crew. Among these, the alert lines are designed to delimit the areas of terrain for which a TAWS alert is likely to appear. As for the alert areas, these show the areas provoking a TAWS alert.

Numerous patent documents describe this type of system. Among them can be cited the patent "EP0 565399 B1" describing all the basic concepts of the TAWSs and the patent application "US 2003/0107499A1" describing a device for displaying areas of terrain with risk and capable of provoking a TAWS alert.

The functions handled by a terrain anti-collision device show limitations. Existing secondary functions of TAWS systems propose a simplified cartographic representation dissociated from the concept of local safety altitude or from values associated with the emergency procedures. Moreover, the safety and operational objectives of such equipment do not destine them to fulfil navigation aid functions. Furthermore, the alert function triggers a message addressed to the crew when a certain safety threshold is crossed. It does not allow the difference relative to this threshold to be calculated or represented.

Other terrain anti-collision devices propose, in the current prototype state, a function for automating the vertical resource in the case of a terrain alert. However, these devices have the drawback of not taking into account the instantaneous vertical climb capabilities of the aircraft, but use default climb rates, a climb angle of 6° for example. Consequently, the proposed avoidance manoeuvre is not guaranteed according to the actual weight or the local temperature. Such an approach is incompatible with the integrity objectives of navigation systems.

The onboard flight management system (FMS) is the computer that determines the geometry of the profile in four dimensions, the three-dimensional space and the time parameter, and which sends to the pilot or to the automatic pilot guidance setpoints to follow this profile. The system calculates the lateral trajectory and the vertical profile, which minimizes the cost, from aeroplane data such as, for example, the weight, the flight plan and the range of cruising levels. The FMS cannot be used as a navigation aid system in the face of obstacles because, for the creation of a flight plan, the system does not check the intersection of the proposed trajectory with the relief and does not have a digital terrain model available with which to perform the calculations to maintain separation from the predicted trajectory with the relief.

SUMMARY OF THE INVENTION

The objective of the invention is to improve flight safety in situations requiring small vertical separations to be maintained in relation to the relief or to artificial obstacles by presenting to the crew all the synthetic digital information generated and by proposing these values to an automatic piloting system to automate their servo-control if necessary.

More specifically, the invention is a calculation method for an aircraft navigation aid system making it possible to maintain a vertical safety margin with an obstruction profile, the aircraft comprising a navigation system, an automatic piloting system, a database system and a display device, characterized in that the method comprises the following steps:
  calculation of an obstruction altitude profile,
  calculation of a vertical safety margin with respect to the obstruction profile,
  calculation of a plurality of vertical safety trajectories and of the respective flight setpoints for the aircraft to execute the trajectories, at least one safety trajectory being a climb-in-altitude flight phase of a configured duration comprising, in succession, a first flight phase approaching the climb phase of a duration predefined in the calculation system and a second rectilinear climb-in-altitude flight phase, selection of the flight setpoints making it possible to maintain the aircraft as close as possible to the obstruction profile while maintaining between the aircraft and the obstruction profile at least the vertical safety margin, filtering of the flight setpoint values so that the variation of the values of the setpoints does not exceed a variation difference in a predefined duration.

The invention is advantageous in that it makes it possible to provide the crew with a navigation aid that systematically offers it a presentation of the remaining margins, altitude and vertical speed for example. The crew has an idea of the piloting margins with respect to potential threats. The presentation of the information has the advantage of being synthetic, simply displaying the remaining difference before approaching a risky area. This information enables the crew to avoid leading the aircraft into risky situations or situations generating alerts in the sense of a TAWS for example, and reduces the surprise effect when an alert appears.

The method also has the advantage of selecting and presenting the flight setpoints of the trajectory making it possible to direct the aircraft as close as possible to the relief and the obstacles while maintaining an adequate safety margin. The vertical safety trajectories can include a point of contact with the obstruction profile increased by the vertical safety margin. The vertical safety trajectories are calculated all along the flight, include their starting points at the same position, that is, from the instantaneous position of the aircraft, and are climb, descent and levelling-off trajectories. The safety trajectory setpoints are instantaneous flight setpoints making it possible to rejoin the safety trajectories at the instantaneous moment. These safety trajectories are predefined in the system. Their function is to calculate the flight setpoints at the instantaneous moment enabling the pilot to approach the obstruction profile as closely as possible while keeping a safety margin. In addition, the display of these flight setpoints in relation to the current flight parameters enables the display device to represent the vertical flight margin on the navigation indicators. Said flight margin represents the difference between the current flight setpoints and the setpoints that make it possible to approach the obstruction profile while remaining in a safe situation. In the rescue intervention case, the crew thus has a piloting indication to bring the aircraft and maintain it as close as possible to the observation or intervention area and to carry out the intervention in the best conditions.

BRIEF DESCRIPTION OF THE DRAWINGS

The invention will be better understood and other benefits will become apparent from reading the description that follows, given by way of nonlimiting example and by virtue of the appended figures in which.

DETAILED DESCRIPTION OF PREFERRED EMBODIMENT

Figure 1:
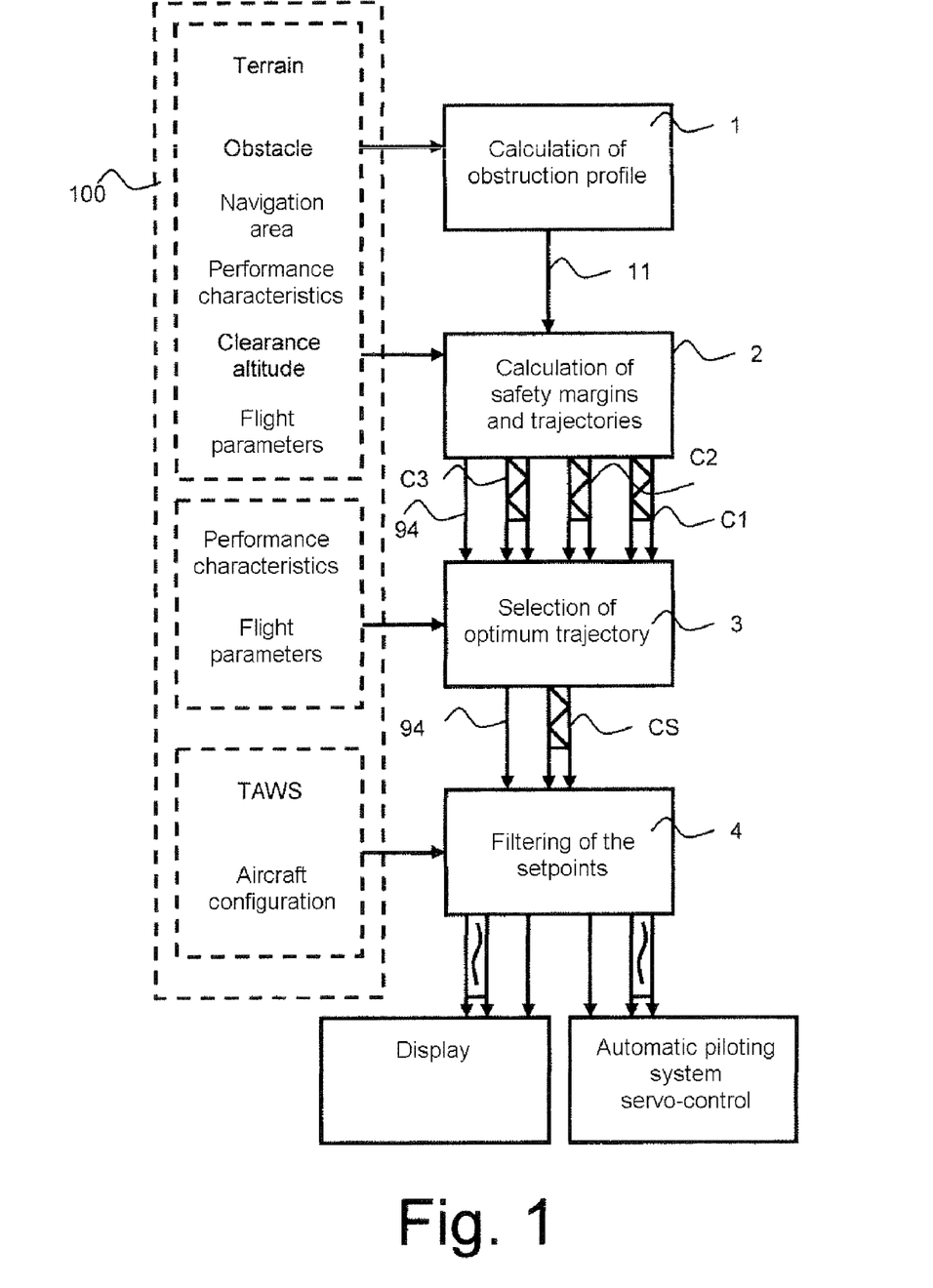
FIG. 1 represents the calculation method making it possible to present the flight margins with respect to an obstruction profile.

The aim of the invention is to enhance the flight safety in situations requiring small vertical separations to be maintained with respect to the relief or artificial obstacles. To achieve this objective, the method implements a succession of steps represented by FIG. 1. A first step for calculating a vertical obstruction profile 92, a second step for calculating a vertical safety margin 94, safety trajectories 801, 802, 803 and associated setpoints C1, C2 and C3, the essential characteristic of which is to include a single point of contact with the vertical obstruction profile 92 increased by the vertical safety margin 94, a third step for selecting the safety trajectory CS making it possible to keep an optimum safety margin with respect to the obstruction profile, a fourth step for filtering the setpoints in order for the piloting indication that has to be displayed not to show high variations over a short duration, and finally, a fifth step for displaying the flight setpoints and the calculated vertical margins and, where appropriate, transmitting the setpoints to the automatic piloting system of the aircraft.

To implement this method, several systems work together. The aircraft includes a navigation system FMS, an automatic piloting system PA, a database system 100 and a display device.

Advantageously, the navigation aid system 106 according to the invention is characterized in that it is arranged to receive data comprising terrain data 92, obstacle data 91 and navigation area data 93 contained in a database 102 to define an obstruction profile, static and dynamic flight parameter data 101, 103, 104, 105 and data from an anti-collision device of TAWS type, all of these data being used to calculate safety trajectories 801, 802, 803 making it possible to continually maintain a safety margin 94, in that the system includes means of selecting the safety trajectory closest to the obstruction profile and tangential at a single point to the obstruction profile increased by a safety margin, and in that the system transmits to a piloting device the value of the setpoints making it possible to execute said safety trajectory.

Advantageously, the transmitted flight setpoints correspond to the speed and vertical speed setpoints making it possible to execute the vertical safety trajectories 801, 802 and 803.

Advantageously, the piloting device is a PFD-type display device 20, represented by FIGS. 6a to 6d, or "synthetic vision system" (SVS), for presenting the relief in three dimensions, displaying the vertical speed setpoints of the safety trajectory 203 at the same time as the instantaneous vertical speed 200, and the vertical safety margin 201 and 211. By way of non-limiting example, the setpoint 203 is called MFVz (minimum following Vz). The device enables the pilot to assess the piloting margin that he has available before being located in flight conditions that would lead the aircraft into a flight area likely to generate TAWS alerts. The crew is thus capable of anticipating a risky situation. Moreover, in the event of an alert from the TAWS, it is proposed to augment the display with the setpoint 202 MCVz (minimum clearance Vz), that is, the minimum vertical speed in an alert situation making it possible to fly over the threatening relief. Advantageously, the calculation system simultaneously displays the height of the aircraft 210 and the margin 211, between the altitude of the aircraft and the point of contact between the proposed setpoint and the vertical safety margin profile, on the altitude indicator 21 of the PFD 20 adding an indication as to its remaining margin with respect to its instantaneous altitude. The values 211 and 201 are defined by the term minimum terrain margin (MTM), that is, the minimum height above the ground. This data can also be displayed on the altitude indicator of the display 22 by the indicator 201. The information generated by the calculation method can also be displayed on a synthetic vision system (SVS) display, representing the external relief in three dimensions.

Advantageously, the piloting device is an automatic piloting system PA executing the flight setpoints CS of the safety trajectory. This implementation mode makes it possible to servo-control the piloting of the aircraft, the aim of which is to maintain it continually at an adequate safety distance from the vertical obstruction profile while also having the objective of remaining as close as possible to the obstruction profile.

All the steps of the method are described below more comprehensively.

Figure 2:
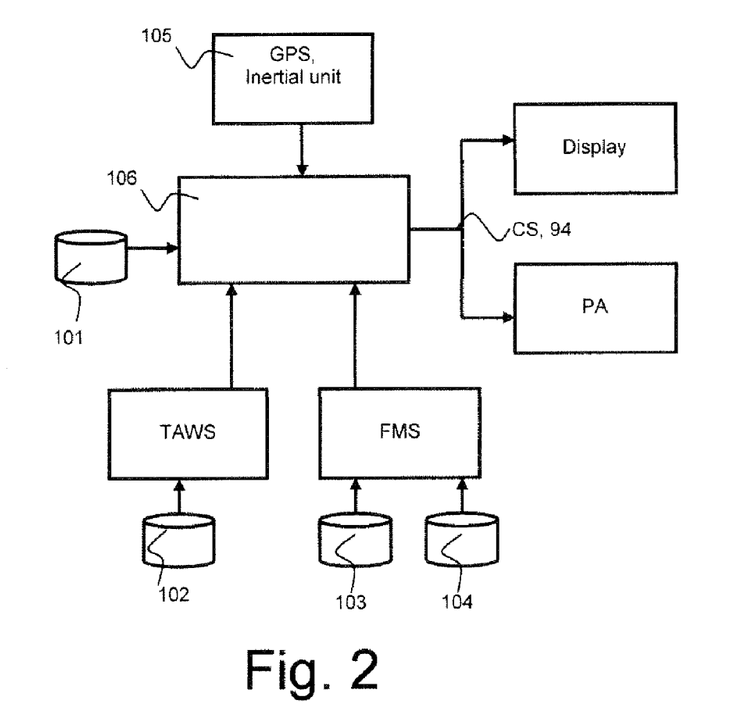
FIG. 2 represents the devices and a first layout making it possible to implement the calculation method.

Advantageously, to calculate the obstruction altitude profile 91, 92, 93, the calculation system extracts the maximum altitude of the obstructions defined by the database 102 comprising the terrain, obstacle and navigation area data 103 and a minimum altitude imposed by the pilot. The terrain data and obstacle data are a terrain model similar to that of a TAWS, specifically optimized for the function in order to reduce the size needed to store it and use it. If the aircraft carries detection devices of sufficiently powerful long range radar type, the obstruction data can be constructed dynamically from such a device. Such a system is thus not subject to the update problems of the databases. The navigation data originate from a navigation information database, identical to that used by the FMS and containing in particular the description of the navigation and air traffic control areas. In a layout of the system represented by FIG. 2, the terrain data 102 originate from the anti-collision device and the navigation data 103 and performance data 104 from the FMS. Each sample of the profile is compared to a clearance altitude selected by the pilot. The maximum value between the two values is retained for the sample concerned. The clearance altitude is the minimum altitude that is used as the minimum level. Any part of the profile below the "clearance" altitude is raised to the clearance altitude. This altitude may be input or selected by means of a rotary switch. This calculation method has the effect of preventing the aircraft from descending lower than the value set by the pilot.

The obstructions to be taken into account in constructing the vertical profile can be configured independently and gradually. It is possible, for example, to take account of the terrain and the obstacles but not the navigation areas or even only a portion of the latter. The same configuration is possible for the obstacles, such as, for example, taking into account high tension line type obstacles.

By way of information, the FMS contains the navigation functions for performing the optimum locating of the aircraft according to the available geo-locating means, such as, for example, satellite, VHF radio or inertial unit means. It also contains the flight plan functions for inputting the geographic elements forming the sketch of the route to be followed, the navigation database functions for constructing geographic routes and procedures from data included in the bases. The FMS also contains the performance databases containing the aerodynamic and engine parameters of the aircraft, the lateral trajectory functions for constructing a continuous trajectory from points of the flight plan, observing the performance characteristics of the aircraft and containment constraints. The FMS also has a prediction function for constructing an optimized vertical profile, a guidance function and digital data links for communicating with control centres and other aircraft.

Figure 3:
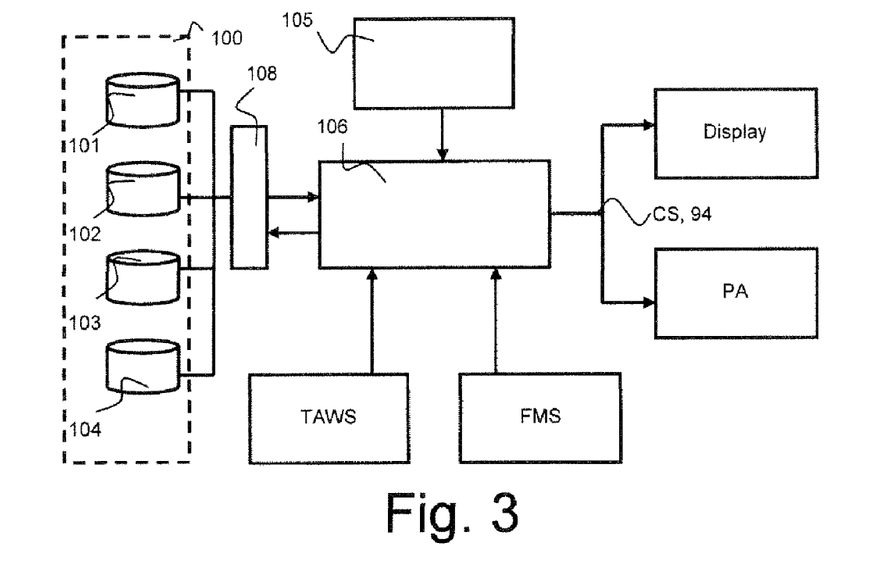
FIG. 3 represents the devices and a second layout making it possible to implement the calculation method.

In another layout of the system represented by FIG. 3, the databases can be accessed via a server 108. In another layout of the system, the method reads the data directly from the respective databases to recover only the necessary information.

Figure 4A:
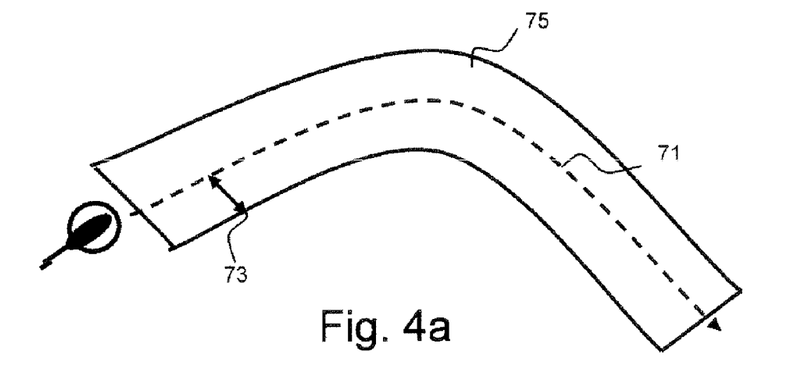
FIG. 4a represents an option for calculating the obstruction profile over the horizontal space according to a first piloting mode. In this first piloting mode, the FMS is engaged and responsible for following the trajectory.
Figure 4B:
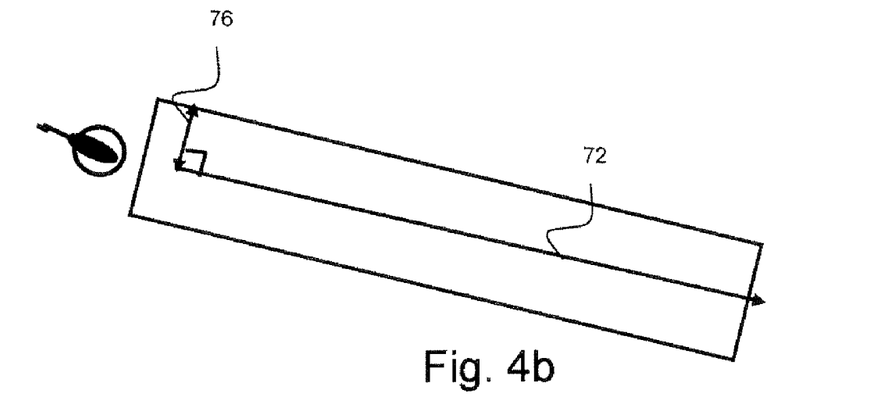
FIG. 4b represents an option for calculating the obstruction profile over the horizontal space according to a second piloting mode. In this second piloting mode, the automatic piloting device is in route or heading following mode but a trajectory is known in a navigation system.
Figure 4C:
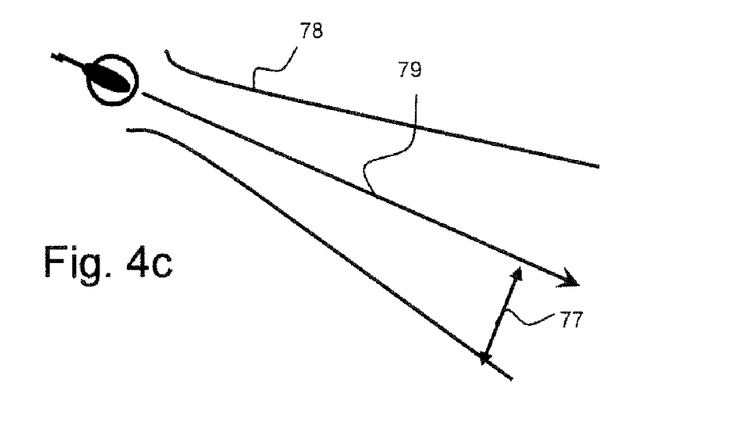
FIG. 4c represents an option for calculating the obstruction profile over the horizontal space according to a third piloting mode. In this third piloting mode, the piloting is manual and no trajectory is known to a navigation system.

The vertical obstruction profile is calculated over a variable horizontal space dependent on the piloting mode, which depends on the navigation system and on the automatic piloting system. FIGS. 4a, 4b and 4c represent the method of calculating the vertical profile. The trajectory-following system of the navigation system is used to guide the aircraft on complex trajectories, whereas the automatic pilot guides the aircraft on a rectilinear trajectory.

Advantageously, when the trajectory-following system of the navigation system FMS is activated, the obstruction profile is calculated over a horizontal space 7D surrounding the points forming the horizontal trajectory 71 recorded in the navigation system of the aircraft, and the width 73 of the horizontal space being determined according to the performance characteristics of the navigation system. In this case, it is only necessary to observe the vertical profile over a space running along the theoretical trajectory recorded in the navigation system of the aircraft.

Advantageously, when the automatic pilot device is in route or heading following mode, the obstruction profile is calculated over a horizontal space surrounding, by a configurable width 76, the points of the horizontal trajectory 72 followed by the automatic pilot. The width 76 then depends on the performance characteristics of the automatic pilot device. The automatic pilot implements simple, generally rectilinear, trajectories.

Advantageously, when the aircraft is guided manually, the obstruction profile is calculated over a horizontal space, in front of the aircraft according to the instantaneous trajectory, of a trapezoidal form 78, the base angular aperture of the trapezium 77 widening as the distance in front of the aircraft increases and being dynamically and dissymetrically modifiable according to the rate of turn and the change of heading.

The angular aperture can also be configurable. The lateral limits of the trapezium 78 can offer a different angle relative to the instantaneous trajectory 79 in front of the aircraft. According to the rate of turn, the aperture 77 can be greater at the level of the limit inside the turn than the opposite limit alongside the turn.

The method determines an obstruction profile according to the piloting mode, notably if the automatic piloting system or if the trajectory-following system of the FMS is engaged. The device then takes into account these elements to assess an obstruction profile that is consistent with the piloting mode. The configuration of the obstruction profile widths 73, 76, 77 depends on the piloting modes thus making it possible to calculate an obstruction profile that is best suited to the piloting situation.

Advantageously, the vertical safety margin is calculated according to the air speed, ground speed and vertical speed flight parameters and possibly by the aircraft location data. These dynamic flight parameters are supplied by the devices 105 comprising the inertial unit, a satellite navigation device and the FMS. The inertial unit also supplies the slope angle information of the aircraft. The vertical margin corresponds to the time needed for the aircraft, according to the instantaneous flight parameters, to avoid the obstructions by providing the maximum climb capabilities, and an anticipation time for the avoidance setpoints to be taken into account by the crew or even the automatic piloting system. These maximum climb capabilities can also depend on the configuration of the aircraft, notably how full the aircraft is. The latter data are generally configured at the FMS level.

Figure 5A:
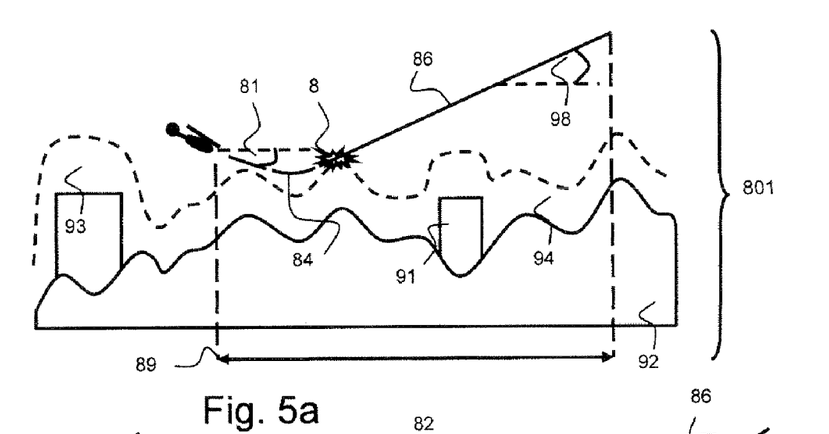
FIG. 5a represents a climb safety trajectory making it possible to maintain a vertical safety margin with the obstruction profile.
Figure 5B:
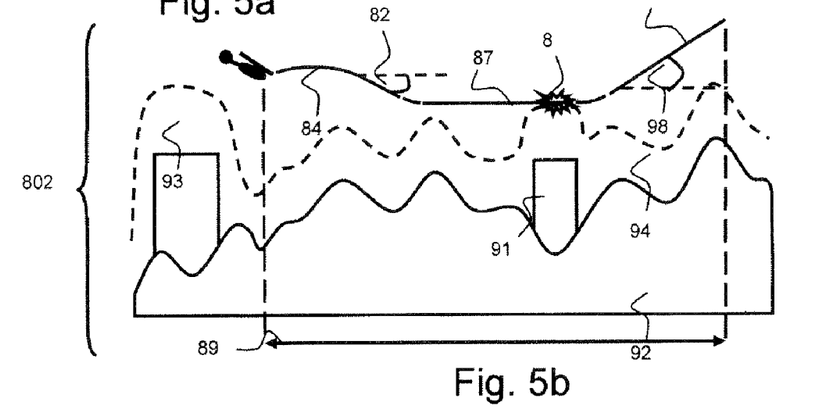
FIG. 5b represents a levelling-off safety trajectory during at least one predefined duration making it possible to maintain a vertical safety margin with the obstruction profile.
Figure 5C:
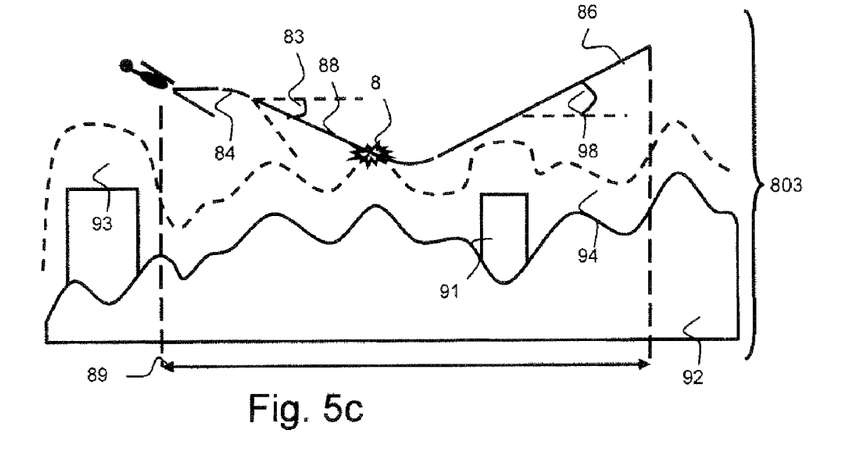
FIG. 5c represents a descent safety trajectory during at least one predefined duration making it possible to maintain a vertical safety margin with the obstruction profile.

The method calculates safety trajectories, commonly called feelers, represented by FIGS. 5a, 5b and 5c. A feeler is defined by a series of rectilinear segments and arcs of circle, the final element of which is prolonged to reach an overall length that is identical for all the feelers. The variations of slope, climb or descent are approached by arcs of circles with constant curvatures which correspond to constant normal load factors. These are system configuration parameters. The values used can be different for climbs and descents in order to respect the comfort of the passengers.

Advantageously, the method calculates safety trajectories, among which at least one safety trajectory comprises a point of contact 8 with the obstruction profile 92 increased in altitude by the vertical margin 94. The calculation method varies the angle 81, 82 and 83, according to the safety trajectories 801, 802, 803 respectively, from a current value to a limit value. The calculation can be made by dichotomy for example. The value retained depends on the type of trajectory calculated. Three feelers are defined, a climb flight phase feeler 801, a levelling-off flight phase feeler 802 and a descent flight phase feeler 803.

The first feeler 801, described by FIG. 5a, is a climb-in-altitude flight phase of a configured duration 89 and it comprises, in succession, a first flight phase 84 approaching the climb phase of a duration predefined in the calculation system, a second rectilinear climb-in-altitude flight phase 86, the point of contact 8 being positioned at the start of the climb phase. The objective of this feeler is to detect the requisite moment for beginning the vertical resource of the aircraft. The slope angle 81, $FPA_{climb}$, is the maximum value, between the instantaneous slope of the aircraft and a value $FPA_{CLIMB\ MAX}$, found to tangentially contact the profile of the relief increased by the vertical margin at a single point 8. $FPA_{CLIMB\ MAX}$ is defined as the maximum climb value that can be achieved by the aircraft. This value is generated from current parameters of the craft and from its performance characteristics. $CAS_{CLIMB}$ is the speed setpoint value calculated by the method to ensure that the aircraft is able to fly the proposed profile. Generally, this value is deduced from the performance tables to find the best trade-off between kinetic energy and the potential energy variation.

The second feeler 803, described by FIG. 5c, is a descent flight phase of a configured duration 89 and it comprises, in succession, a first flight phase 84 approaching the descent phase of a duration predefined in the calculation system, a second descent phase 88 of a time at least equal to a configured duration $T_{LLF}$ and a third climb phase 86, the point of contact 8 being positioned at the end of the descent flight phase. The objective of this feeler is to detect the requisite moment for beginning a descent of the aircraft, valid for a duration at least equal to $T_{LLF}$. The initial angle of the feeler is the instantaneous angle of the aircraft. The slope angle 83, $FPA_{DESCENT}$, is the maximum value, between the instantaneous slope of the aircraft and a configurable value $FPA_{DESCENT\ MIN}$, found to tangentially contact the profile of the relief increased by the vertical margin at a single point 8. $FPA_{DESCENT\ MIN}$ is defined as the configurable descent value under the greatest slope to ensure the margins relative to the field of flight of the aircraft, but also the comfort to be ensured for the passengers according to the mission being carried out by the aircraft. $CAS_{DESCENT}$ is defined as the speed setpoint value calculated by the method. Generally, this value is identical to the current speed value of the aircraft.

The third feeler 802, described by FIG. 5b, is a levelling-off flight phase of a configured duration 89 and it comprises, in succession, a first flight phase 84 approaching the levelling-off phase of a duration predefined in the calculation system, a second levelling-off phase 87 of a time at least equal to a configured duration $T_{LLF}$ and a third climb phase 86, the point of contact 8 being positioned at the end of the levelling-off phase. The objective of this feeler is to detect the requisite moment for beginning the levelling off of the aircraft, valid for a duration at least equal to $T_{LLF}$. The initial angle of the feeler is the instantaneous angle of the aircraft. The slope angle 82, $FPA_{LEVEL}$, is the value, between $FPA_{CLIMB\ MAX}$ and $FPA_{DESCENT\ MIN}$, found to tangentially contact the profile of the relief increased by the vertical margin 94. $CAS_{LEVEL}$ is the speed setpoint value calculated by the method. Generally, this value is identical to the current speed value of the aircraft.

Advantageously, the climb slope angle 98 of the feelers is equal to a proportion equal to or less than the maximum climb angle of the aircraft, this proportion being configurable in the calculation system according to the configuration of the aircraft in terms of how full it is or according to a value defined by the crew. This functionality thus makes it possible to take into account the real capabilities of the aircraft according to the instantaneous situation and to present accurate flight margins. The crew can also choose a climb angle value less than the maximum slope angle so that the manoeuvre is more comfortable for the passengers. In addition, the method according to the invention calculates safety trajectories anticipating the entry of the aircraft into a risky area, so there is no need to execute an emergency manoeuvre by applying maximum vertical resources. This function is advantageous, notably for rescue helicopters when they board wounded people who have to remain immobilized.

Figures 6A, 6B, 6C, 6D:
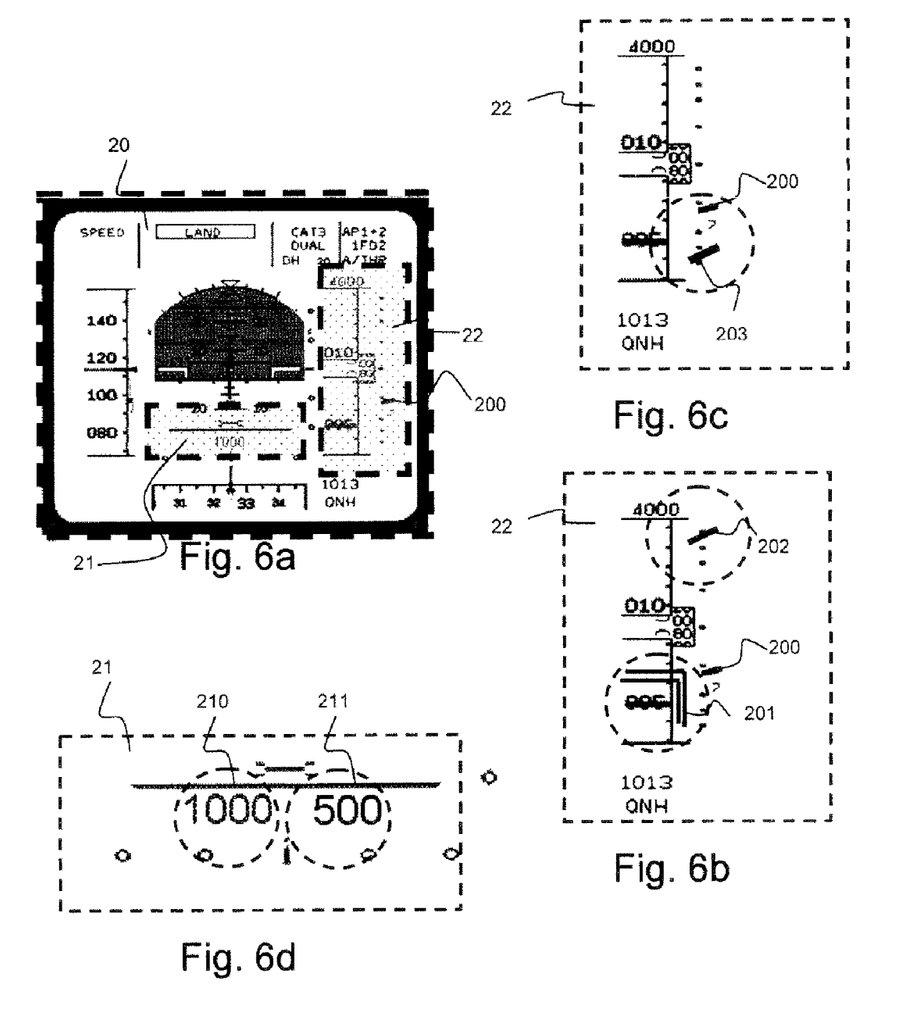
FIG. 6a represents a display mode for the information generated by the calculation method on a primary flight display (PFD) type display.
FIG. 6b represents the vertical speed indicator on the PFD display showing an alerting situation with respect to the obstruction profile where the method displays the minimum vertical speed to be reached.
FIG. 6c represents the vertical speed indicator on the PFD display showing a situation in which the crew has an adequate safety margin with respect to the obstruction profile.
FIG. 6d represents the altitude indicator on the PFD display with the vertical margin with respect to the obstruction profile.

Concerning the margin MTM, the altitude value used is that of the point of contact 8. The height displayed 211 is defined by the difference between the altitude of the carrier and that of the point 8.

Advantageously, for all three feelers, the duration predefined in the calculation system of the approach phase 84 corresponds to the calculation time needed to display the data. Advantageously, when the calculation system transmits the flight setpoints CS to the automatic piloting system PA, the duration predefined in the calculation system of the approach phase corresponds to the calculation time needed for the automatic piloting system to apply the flight setpoints. These two durations make it possible to leave an anticipation time and time to take account of the flight margins to execute the safety trajectory.

Figure 7:
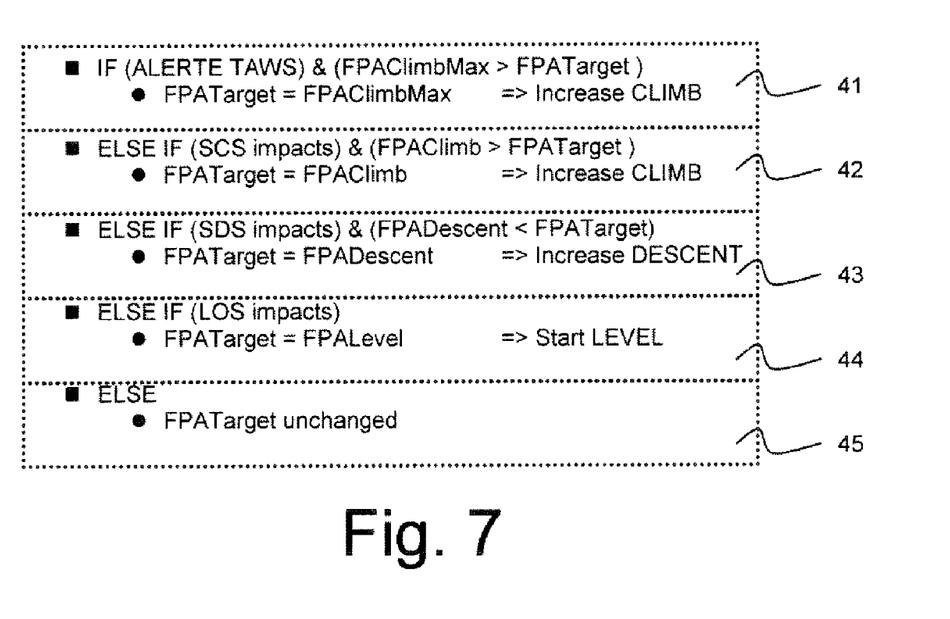
FIG. 7 is the algorithm for selecting flight setpoints to maintain the aircraft with adequate safety margins as close as possible to the vertical profile.

The method of selecting the calculated flight setpoints is designed so that the trajectory retained is that which makes it possible to maintain the aircraft as close as possible to the vertical profile augmented by the safety margin, the aim of the selection process being to implement, as soon as possible, a descent trajectory of a duration at least equal to the value $T_{LLF}$, to implement a climb trajectory as late as possible and to keep to the minimum the vertical safety margin between the aircraft and the vertical profile. The selection of the trajectory is calculated according to an algorithm that analyses the instantaneous flight conditions and the calculated safety trajectories. The data originate from the anti-collision device and from the means supplying the instantaneous flight parameters. The selection algorithm is described in FIG. 7 and defines the setpoints to be selected according to a series of situations 41 to 45 being studied. The terms relating to the slope angles "FPA" have been described previously and the following terms are defined:

SCS impacts: condition if a point of contact exists for the climb trajectory 801, SDS impacts: condition if a point of contact exists for the climb trajectory 803, LOS impacts: condition if a point of contact exists for the climb trajectory 802.

The algorithm for selecting the flight setpoints is executed on the values of the slope angles of the aircraft and those of the calculated safety trajectories. The FPA generated by the selection process is $FPA_{TARGET}$ and the requested speed is that associated with the FPA that is retained.

Advantageously, when an anti-collision alert is active and the slope angle required to execute the maximum climb trajectory is greater than the instantaneous slope angle of the aircraft, the calculation system transmits to the display device the vertical speed 202 corresponding to the maximum climb angle of the aircraft. This first test 41 checks that the aircraft is not situated in a risky area. If it is, it must provide the display or the automatic piloting system with the minimum vertical speed in an alert situation making it possible to fly over the threatening relief.

If a point of contact is found for the climb trajectory 801 and the slope angle required to execute the climb trajectory is greater than the instantaneous slope angle of the aircraft, then the method produces the required flight setpoints, associated with the slope angle, to execute the climb trajectory 801. If the situation 42 is verified, then the setpoint for the crew or the aircraft is to climb, because, if the crew maintains the instantaneous flight conditions, the aircraft will certainly enter into risky areas.

If a point of contact is found for the descent trajectory 803 and the slope angle required to execute the descent trajectory is less than the instantaneous slope angle of the aircraft, then the method produces the requisite flight setpoints, associated with the slope angle, to execute the descent trajectory 803. The setpoint for the aircraft is then to descend, because it has an adequate safety margin to descend for a duration at least equal to a duration configured in the system. By way of nonlimiting example, the descent duration is equal to approximately a few tens of seconds.

When the cases 41, 42 and 43 do not arise, a check is carried out to see if the aircraft can execute a levelling-off trajectory for at least a duration $T_{LLF}$; by way of nonlimiting example, this duration can be approximately five minutes. If a point of contact is found for the levelling-off trajectory 802, then the method produces the required flight setpoints, associated with the slope angle, to execute the levelling-off trajectory 802. When the cases 41 to 44 do not arise, the slope angle and the speed and vertical speed setpoints are maintained.

For each of the feelers, this calculated slope angle is bounded by configuration by extreme values that are compatible with the flight dynamics of the aircraft. Also, in certain cases, when the aircraft is situated at a great distance from the relief, it is possible that no tangential contact is found. In this case, $FPA_{TARGET}$ is not modified. The old value is retained. By default, it is initialized with the minimum descent value.

When the appropriate flight setpoints are selected, the method applies a temporal smoothing of the data to allow a maximum rate of variation per time unit for each of the output data. This action avoids displaying and transmitting to the automatic piloting system setpoints that vary constantly and by a wide amplitude.

The invention applies to the air navigation aid devices that offer the crew piloting margins. It applies particularly to rescue helicopters which generally intervene in areas of uneven relief and at low altitude. The method according to the invention can be a functionality incorporated in the anti-collision devices already present onboard the aircraft. The invention can also be an isolated calculation device directly connected to its environment.

What is claimed is:

1. Calculation method for an aircraft navigation aid system making it possible to maintain a vertical safety margin with an obstruction profile, wherein the method comprises the following steps:

calculation of an obstruction altitude profile, calculation of a vertical safety margin with respect to the obstruction profile, calculation of a plurality of vertical safety trajectories and of the respective flight setpoints for the aircraft to execute the trajectories, at least one safety trajectory being a climb-in-altitude flight phase of a configured duration comprising, in succession, a first flight phase approaching the climb phase of a duration predefined in the calculation system and a second rectilinear climb-in-altitude flight phase, selection of the flight setpoints making it possible to maintain the aircraft as close as possible to the obstruction profile while maintaining between the aircraft and the obstruction profile at least the vertical safety margin, filtering of the flight setpoint values so that the variation of the values of the setpoints does not exceed a variation difference in a predefined duration.

2. Method according to claim 1, wherein at least one of the vertical safety trajectories is a descent flight phase of a configured duration and in that it comprises, in succession, a first flight phase approaching the descent phase of a duration predefined in the calculation system, a second descent phase of a time at least equal to a configured duration and a third climb phase.

3. Method according to claim 2, wherein at least one of the predefined vertical trajectories is a levelling-off flight phase of a configured duration and in that it comprises, in succession, a first flight phase approaching the levelling-off phase of a duration predefined in the calculation system, a second levelling-off phase of a time at least equal to a configured duration and a third climb phase.

4. Method according to claim 3, wherein the climb slope angle is equal to a proportion equal to or less than the maximum climb angle of the aircraft, this proportion being configurable in the calculation system.

5. Method according to claim 4, wherein the flight setpoints correspond to the speed and vertical speed setpoints making it possible to execute the vertical safety trajectories.

6. Method according to claim 5, wherein at least one safety trajectory comprises a point of contact with the obstruction profile increased in altitude by the vertical margin:
for the climb flight phase, the single point of contact being positioned at the start of the climb phase,
for the descent flight phase, the single point of contact being positioned at the end of the descent flight phase,
and for the levelling-off flight phase, the single point of contact being positioned at the end of the levelling-off phase.

7. Method according to claim 6, wherein, when an anti-collision alert is active and the slope angle required to execute the maximum climb trajectory is greater than the instantaneous slope angle of the aircraft, the calculation system displays the vertical speed corresponding to the maximum climb angle of the aircraft.

8. Method according to claim 6, wherein the calculation system simultaneously displays the vertical speed setpoint and the instantaneous vertical speed of the aircraft on the display device.

9. Method according to claim 8, wherein the calculation system simultaneously displays the height of the aircraft and the margin between the altitude of the aircraft and the point of contact between the proposed setpoint and the vertical safety margin profile.

10. Method according to claim 9, wherein the duration predefined in the calculation system of the approach phase corresponds to the calculation time needed to display the data.

11. Method according to claim 10, wherein the calculation system transmits the flight setpoints to an automatic piloting system.

12. Method according to claim 11, wherein the duration predefined in the calculation system of the approach phase corresponds to the calculation time needed for the automatic piloting system to apply the flight setpoints.

13. Method according to claim 12, wherein the vertical safety margin is calculated according to the air speed, ground speed and vertical speed flight parameters.

14. Method according to claim 13, wherein the vertical margin is calculated according to the location of the aircraft with respect to airport areas.

15. Method according to claim 1, wherein, when the trajectory-following system of the navigation system is activated, the obstruction profile is calculated over a horizontal space surrounding the points forming the horizontal trajectory recorded in the navigation system of the aircraft, and the width of the horizontal space being determined according to the performance characteristics of the navigation system.

16. Method according to claim 1, wherein, when the automatic pilot device is in route or heading following mode, the obstruction profile is calculated over a horizontal space surrounding, by a configurable width, the points of the horizontal trajectory followed by the automatic pilot, the width of the horizontal space being determined according to the performance characteristics of the automatic pilot device.

17. Method according to claim 1, wherein, when the aircraft is guided manually, the obstruction profile is calculated over a horizontal space, in front of the aircraft according to the instantaneous trajectory, of a trapezoidal form, the base angular aperture of the trapezium widening as the distance in front of the aircraft increases and being dynamically and dissymmetrically modifiable according to the rate of turn and the change of heading.

* * * * *

UNITED STATES PATENT AND TRADEMARK OFFICE
CERTIFICATE OF CORRECTION

PATENT NO.         : 8,145,365 B2
APPLICATION NO.    : 12/487919
DATED              : March 27, 2012
INVENTOR(S)        : Laurent Flotte, Nicolas Marty and Aurelie Sallier It is certified that error appears in the above-identified patent and that said Letters Patent is hereby corrected as shown below:

In the Specification:

Column 6 line 45 delete "7D" and replace with --75--.

Signed and Sealed this
Fifteenth Day of May, 2012

David J. Kappos
*Director of the United States Patent and Trademark Office*